US009011085B2

(12) United States Patent
Suciu et al.

(10) Patent No.: US 9,011,085 B2
(45) Date of Patent: Apr. 21, 2015

(54) CERAMIC MATRIX COMPOSITE CONTINUOUS "I"-SHAPED FIBER GEOMETRY AIRFOIL FOR A GAS TURBINE ENGINE

(75) Inventors: Gabriel L. Suciu, Glastonbury, CT (US); Ioannis Alvanos, West Springfield, MA (US)

(73) Assignee: United Technologies Corporation, Hartford, CT (US)

( * ) Notice: Subject to any disclaimer, the term of this patent is extended or adjusted under 35 U.S.C. 154(b) by 969 days.

(21) Appl. No.: 13/116,156

(22) Filed: May 26, 2011

(65) Prior Publication Data
US 2012/0301313 A1  Nov. 29, 2012

(51) Int. Cl.
*F01D 9/04* (2006.01)
*F01D 25/24* (2006.01)
*F01D 5/28* (2006.01)
*F01D 11/00* (2006.01)

(52) U.S. Cl.
CPC ............. *F01D 25/246* (2013.01); *F01D 5/282* (2013.01); *F01D 5/284* (2013.01); *F01D 9/041* (2013.01); *F01D 11/008* (2013.01); *F05D 2300/6033* (2013.01); *F05D 2240/12* (2013.01)

(58) Field of Classification Search
USPC ............................ 415/191, 200, 208.1, 208.2, 415/209.2–209.4, 210.1, 189–190; 416/189–192, 193 R, 193 A, 229 R, 416/229 A, 230, 241 B; 29/889, 889.2, 29/889.22, 889.7, 889.71, 889.72, 889.721
See application file for complete search history.

(56) References Cited

U.S. PATENT DOCUMENTS

| 6,196,794 | B1 | 3/2001 | Matsumoto | |
|---|---|---|---|---|
| 6,200,092 | B1 | 3/2001 | Koschier | |
| 6,325,593 | B1 * | 12/2001 | Darkins et al. | 415/115 |
| 7,510,379 | B2 | 3/2009 | Marusko et al. | |
| 2006/0228211 | A1 * | 10/2006 | Vance et al. | 415/200 |
| 2007/0166151 | A1 * | 7/2007 | Burdgick et al. | 415/191 |
| 2010/0068034 | A1 * | 3/2010 | Schiavo et al. | 415/115 |
| 2011/0027098 | A1 | 2/2011 | Noe et al. | |
| 2012/0099982 | A1 * | 4/2012 | Coupe et al. | 415/200 |

FOREIGN PATENT DOCUMENTS

| JP | 2008151117 | 7/2008 | |
|---|---|---|---|
| WO | WO-91/15357 | * 10/1991 | F01D 5/28 |
| WO | 2010146288 | 12/2010 | |

OTHER PUBLICATIONS

European Search Report for European Application No. 12169224.8 completed 15 Dec. 2014.

* cited by examiner

*Primary Examiner* — Christopher Verdier
(74) *Attorney, Agent, or Firm* — Carlson, Gaskey & Olds, P.C.

(57) ABSTRACT

A Ceramic Matrix Composites (CMC) airfoil for a gas turbine engine includes at least one CMC ply which defines a suction side, an outer platform, a pressure side and an inner platform with a continuous "I"-shaped fiber geometry.

20 Claims, 6 Drawing Sheets

CERAMIC MATRIX COMPOSITE CONTINUOUS "I"-SHAPED FIBER GEOMETRY AIRFOIL FOR A GAS TURBINE ENGINE

BACKGROUND

The present disclosure relates to a gas turbine engine, and more particularly to Ceramic Matrix Composites (CMC) components therefor.

The turbine section of a gas turbine engine includes a multiple of airfoils which operate at elevated temperatures in a strenuous, oxidizing type of gas flow environment and are typically manufactured of high temperature superalloys. CMC materials provide higher temperature capability than metal alloys and a high strength to weight ratio. Ceramic matrix composite materials, however, require particular manufacturing approaches as the fiber orientation primarily determines the strength capability.

SUMMARY

A Ceramic Matrix Composites (CMC) airfoil for a gas turbine engine according to an exemplary aspect of the present disclosure includes at least one CMC ply which defines a suction side, an outer platform, a pressure side and an inner platform with a continuous "I"-shaped fiber geometry.

A vane structure for a gas turbine engine according to an exemplary aspect of the present disclosure includes a multiple of CMC airfoil sections integrated between an outer ring and an inner ring, each of the multiple of CMC airfoil sections formed from at least one CMC ply which defines a suction side, an outer platform, a pressure side and an inner platform with a continuous "I"-shaped fiber geometry.

A method of forming a Ceramic Matrix Composite airfoil for a gas turbine engine according to an exemplary aspect of the present disclosure includes wrapping at least one CMC ply in a continuous "I"-shaped fiber geometry to define a suction side, an outer platform, a pressure side and an inner platform.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
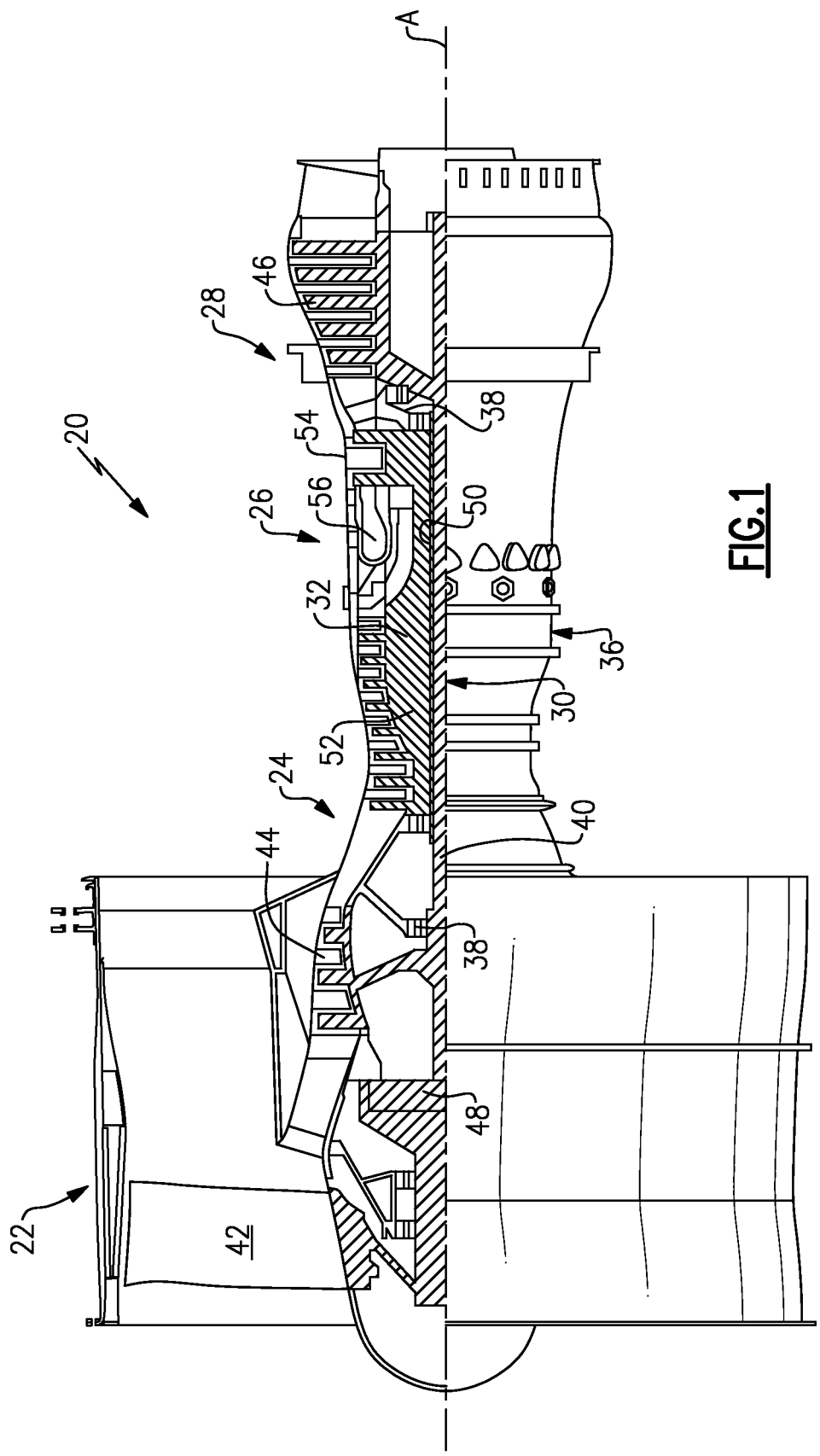
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low speed spool 30 and high speed spool 32 in response to the expansion.

Figure 2:
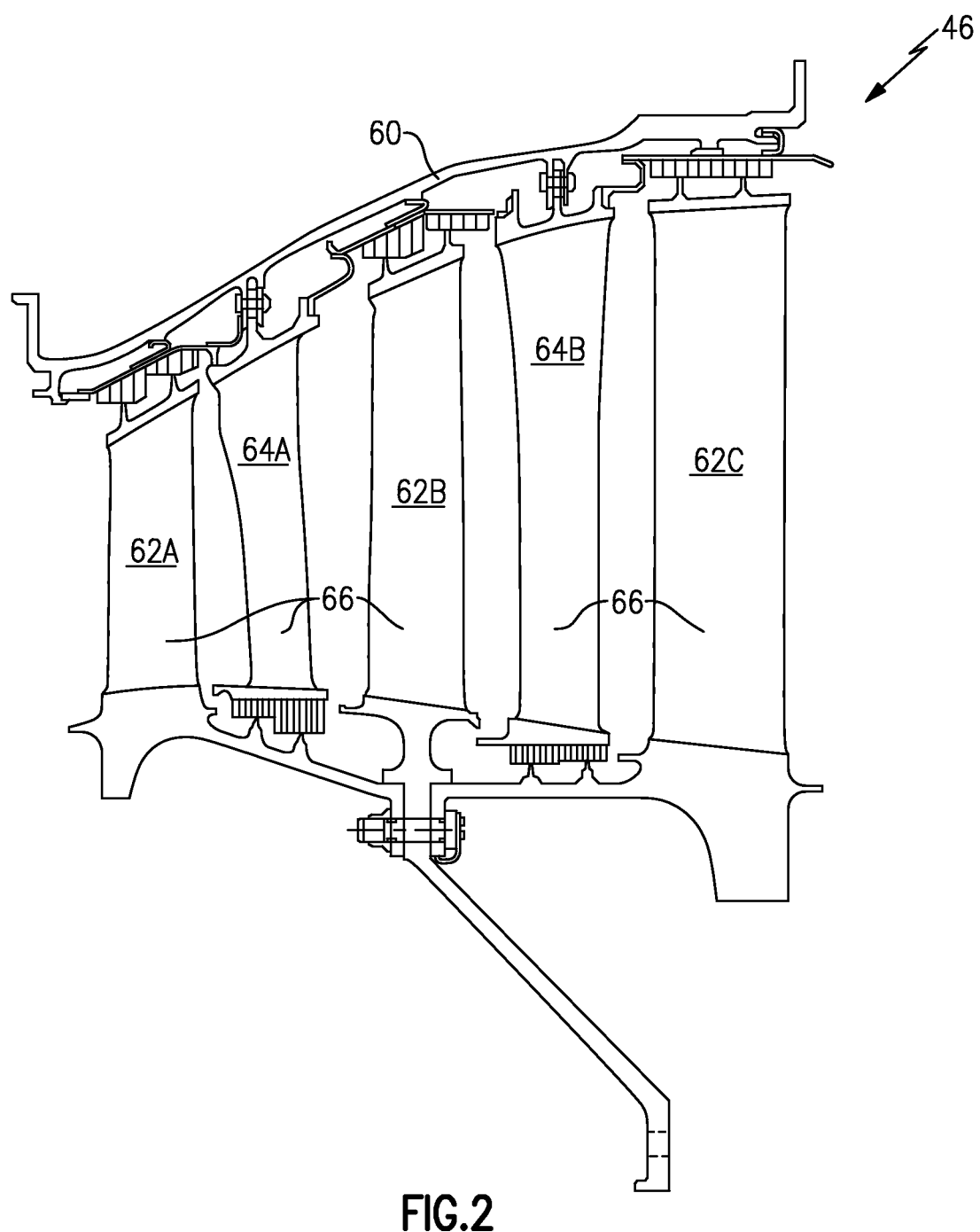
FIG. 2 is an enlarged sectional view of a Low Pressure Turbine section of the gas turbine engine.
Figure 3:
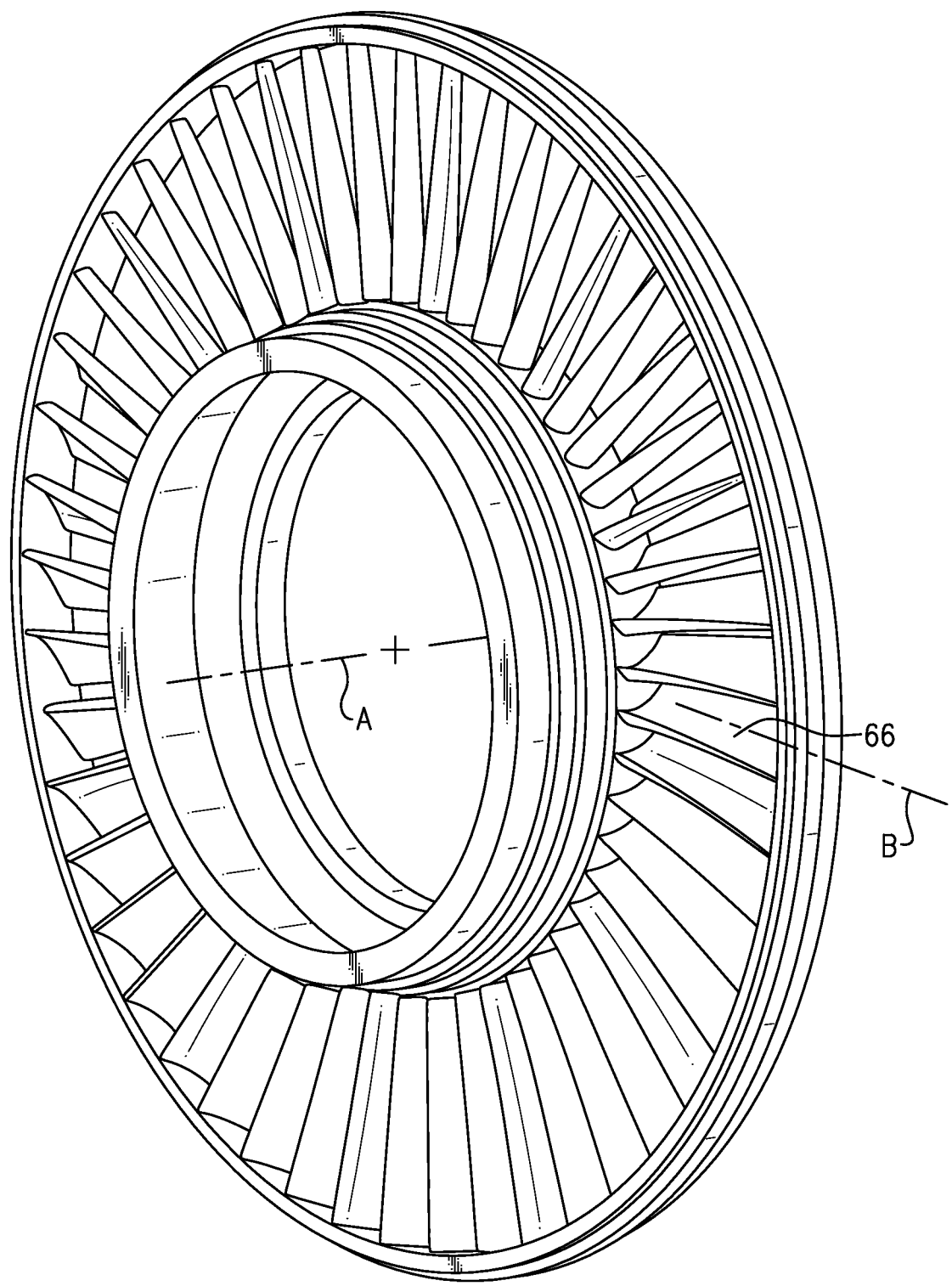
FIG. 3 is an enlarged perspective view of an example rotor disk of the Low Pressure Turbine section.
Figure 4:
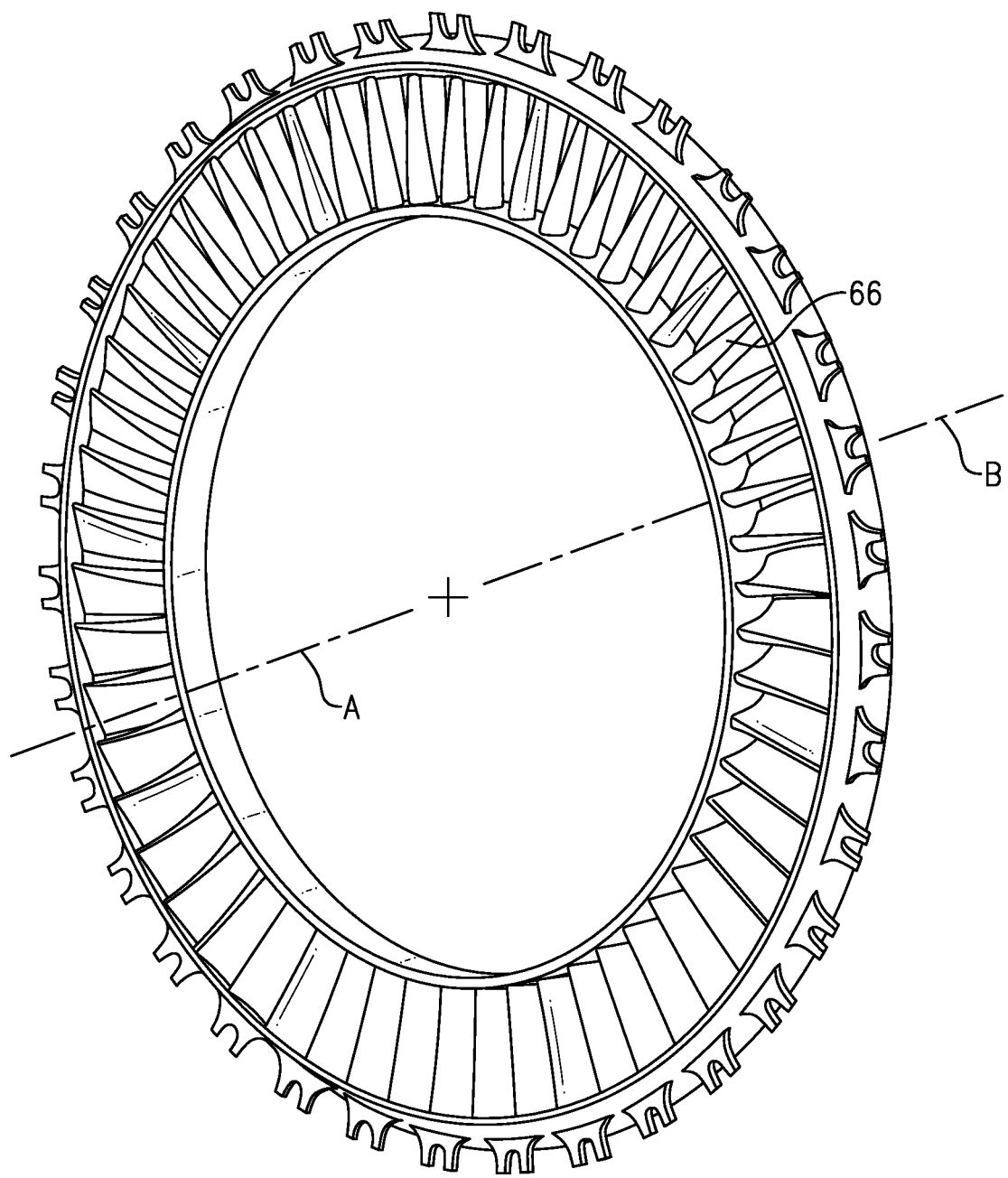
FIG. 4 is an enlarged perspective view of an example stator vane structure of the Low Pressure Turbine section.

With reference to FIG. 2, the low pressure turbine 46 generally includes a low pressure turbine case 60 with a multiple of low pressure turbine stages. The stages include a multiple of rotor structures 62A, 62B, 62C interspersed with vane structures 64A, 64B. Each of the rotor structures 62A, 62B, 62C and each of the vane structure 64A, 64B may include airfoils 66 manufactured of a ceramic matrix composite (CMC) material typically in a ring-strut-ring full hoop structure (FIGS. 3 and 4). It should be understood that the term full hoop is defined herein as an uninterrupted member such that the vanes do not pass through apertures formed therethrough. It should be also understood that examples of CMC material for all componentry discussed herein may include, but are not limited to, for example, S200 and SiC/SiC. It should be further understood that examples of metal superalloy for all componentry discussed herein may include, but are not limited to, for example, INCO 718 and Waspaloy. Although depicted as a low pressure turbine in the disclosed embodiment, it should be understood that the concepts described herein are not limited to use with low pressure turbine as the teachings may be applied to other sections such as high pressure turbine, high pressure compressor, low pressure compressor and intermediate pressure turbine and intermediate pressure turbine of a three-spool architecture gas turbine engine.

Figure 5:
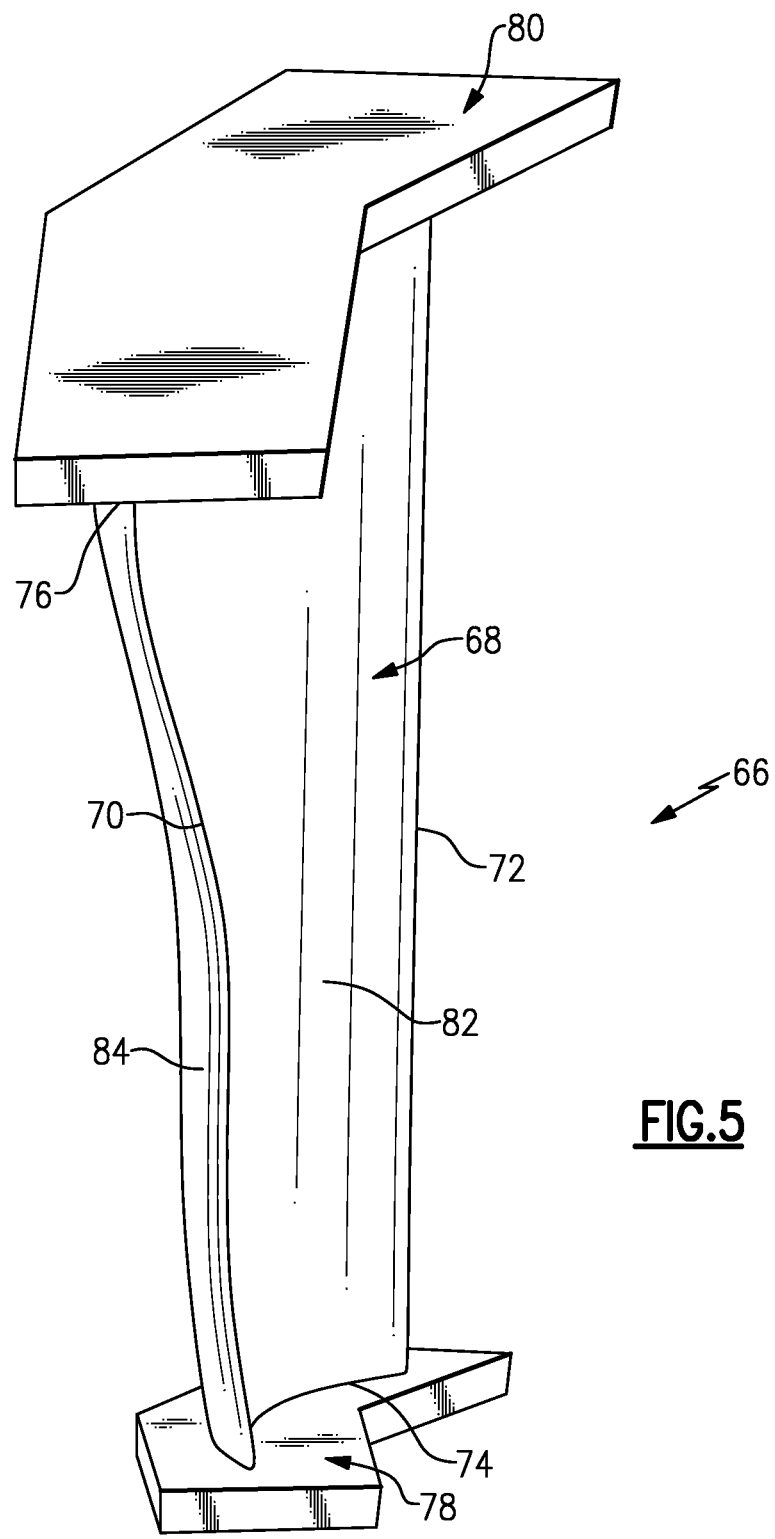
FIG. 5 is a perspective view of a CMC airfoil.

With reference to FIG. 5, one CMC airfoil 66 usable with a ring-strut-ring full hoop structure is illustrated. Although a somewhat generic airfoil 66 will be described in detail hereafter, it should be understood that various rotary airfoils or blades and static airfoils or vanes such as those within the low pressure turbine 46 may be particularly amenable to the fabrication described herein.

The CMC airfoil 66 generally includes an airfoil portion 68 defined between a leading edge 70 and a trailing edge 72. The airfoil portion 68 includes a generally concave shaped portion which forms a pressure side 82 and a generally convex shaped portion which forms a suction side 84. Each airfoil 66 may include a fillet 74, 76 to provide a transition on each side of the airfoil portion 68 to a respective platform segment 78, 80. The platform segments 78, 80 form the inner diameter and outer diameter of the core gas path.

Figure 6:
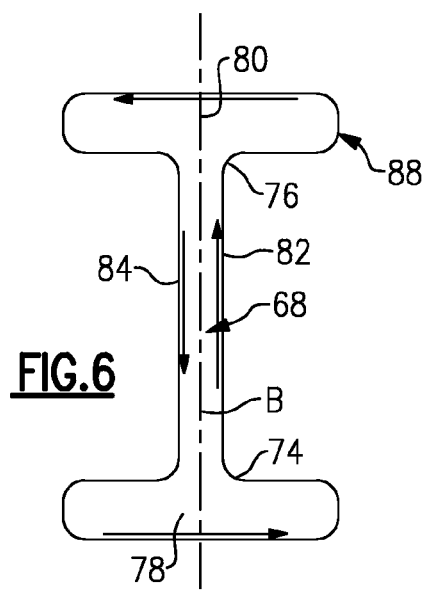
FIG. 6 is a schematic front view of the CMC airfoil structure illustrating a fiber arrangement disclosed herein.
Figure 7:
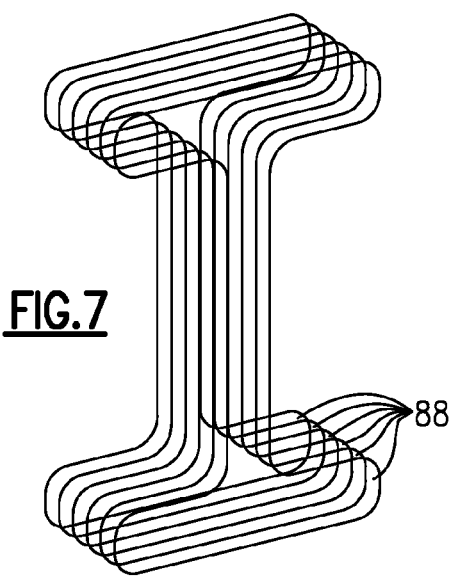
FIG. 7 is a perspective schematic view of the CMC airfoil structure illustrating a fiber arrangement disclosed herein.

The fabrication of the CMC airfoil 66 in the disclosed non-limiting embodiment utilizes an "I"-shape fiber geometry (illustrated schematically; FIGS. 6 and 7). This geometry facilitates the integrity of the individual fibers and allows the airfoil portion 68 to be robustly connected to the inner and outer platform segments 78, 80 in an integral manner. That is, the "I" shape geometry provides for continuity in the internal stress carrying CMC structural fibers to achieve maximum strength-to-weight as the airfoil portion 68 and platform segments are formed in a contiguous manner. It should be understood that various CMC manufacturability is applicable.

With reference to FIG. 6, at least one CMC ply 88 is wrapped in the "I" shape to arrange the structural fibers (FIG. 7) in the "I" shape to form the pressure side 82, the platform segment 78, the suction side 84 and the platform segment 80 in a continuous manner. A first portion of the CMC ply 88 defines the airfoil portion 68 while transverse portions of the CMC ply 88 form the platform segments 78, 80. The first portion forms the pressure side 82 and the suction side 84 of the airfoil portion 68. At least a portion of the innermost CMC plies 88 may be spaced from or directly adjacent to a central airfoil axis B to form either a solid or cored airfoil portion 68.

Figure 8:
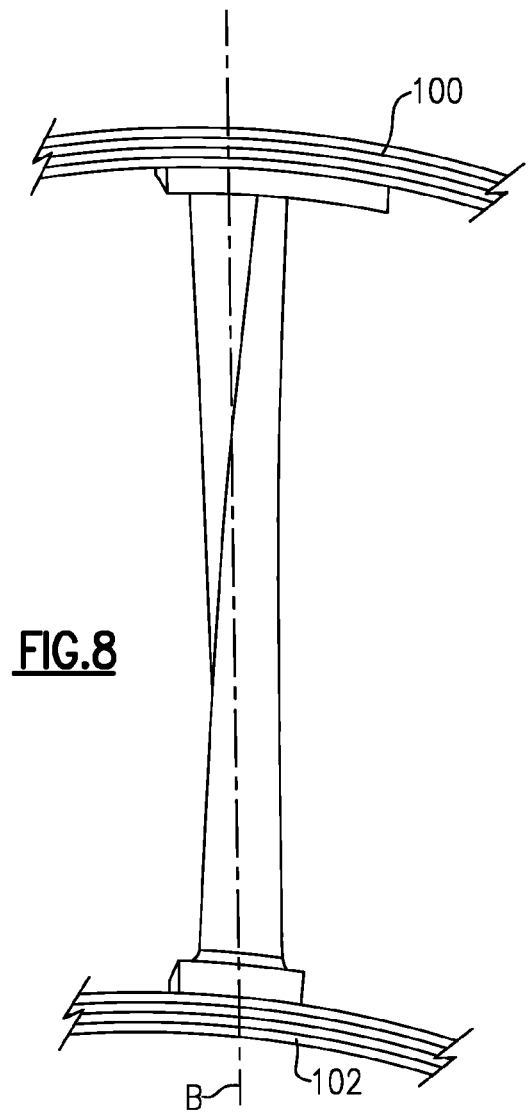
FIG. 8 is an enlarged front perspective view of a CMC airfoil bonded within an inner and outer full hoop ring.

In the disclosed non-limiting embodiment, the platform segments 78, 80 are chevron-shaped to provide a complementary geometry for abutting edge engagement of each adjacent platform segment to define the inner and outer core gas path (FIG. 3). That is, the CMC airfoils 66 are assembled in an adjacent complementary manner to form a ring of airfoils which are further wrapped with a CMC outer ring 100 and a CMC inner ring 102 about the multiple of the respectively adjacent platform segments 78, 80 to form full hoops (FIG. 8). It should be understood that appropriate twist and the like may be readily included and is not shown in the schematic views of FIGS. 7 and 8.

The disclosed fabrication approach allows for ease of production for a single or multiple airfoil cluster based on a continuous "I" shape. It should be understood that the term continuous as illustrated in FIGS. 6 and 7 refers to an uninterrupted CMC ply to maximize strength.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A Ceramic Matrix Composite (CMC) airfoil for a gas turbine engine comprising:
   at least one CMC ply which defines a suction side, an outer platform, a pressure side and an inner platform, said at least one CMC ply including a plurality of fibers, said fibers having a continuous "I"-shaped geometry.

2. The Ceramic Matrix Composite airfoil as recited in claim 1, wherein at least a portion of an innermost CMC ply is spaced from a central airfoil axis to form a cored airfoil.

3. The Ceramic Matrix Composite airfoil as recited in claim 1, wherein an innermost CMC ply is directly adjacent a central airfoil axis to form a solid airfoil.

4. The Ceramic Matrix Composite airfoil as recited in claim 1, wherein said outer platform is chevron-shaped.

5. The Ceramic Matrix Composite airfoil as recited in claim 1, wherein said inner platform is chevron-shaped.

6. The Ceramic Matrix Composite airfoil as recited in claim 1, wherein said outer platform is chevron-shaped, and said inner platform is chevron-shaped.

7. The Ceramic Matrix Composite airfoil as recited in claim 1, wherein said pressure side is generally concave.

8. The Ceramic Matrix Composite airfoil as recited in claim 1, wherein said suction side is generally convex.

9. The Ceramic Matrix Composite airfoil as recited in claim 1, further comprising first and second fillets between said pressure side and said inner and outer platforms, respectively.

10. The Ceramic Matrix Composite airfoil as recited in claim 1, further comprising first and second fillets between said suction side and said inner and outer platforms, respectively.

11. The Ceramic Matrix Composite airfoil as recited in claim 1, wherein in the at least one CMC ply comprises a plurality of CMC plies.

12. A Ceramic Matrix Composite (CMC) vane structure for a gas turbine engine comprising:
    a CMC outer ring;
    a CMC inner ring; and
    a multiple of CMC airfoil sections integrated between said CMC outer ring and said CMC inner ring, each of said multiple of CMC airfoil sections formed from at least one CMC ply which defines a suction side, an outer platform, a pressure side and an inner platform, said at least one CMC ply including a plurality of fibers, said fibers having a continuous "I"-shaped geometry.

13. The Ceramic Matrix Composite (CMC) vane structure as recited in claim 12, wherein said multiple of CMC airfoil sections are located within a Low Pressure Turbine.

14. The Ceramic Matrix Composite (CMC) vane structure as recited in claim 12, wherein said multiple of CMC airfoil sections are located within a High Pressure Compressor.

15. The Ceramic Matrix Composite (CMC) vane structure as recited in claim 12, wherein said outer platform is chevron-shaped.

16. The Ceramic Matrix Composite (CMC) vane structure as recited in claim 12, wherein said inner platform is chevron-shaped.

17. The Ceramic Matrix Composite (CMC) vane structure as recited in claim 12, wherein said outer platform is chevron-shaped, and said inner platform is chevron-shaped.

18. A method of forming a Ceramic Matrix Composite (CMC) airfoil for a gas turbine engine comprising:

wrapping at least one CMC ply to define a suction side, an outer platform, a pressure side and an inner platform, the at least one CMC ply including a plurality of fibers, the fibers having a continuous "I"-shaped geometry.

19. The method as recited in claim 18, further comprising:
spacing an innermost CMC ply apart from a central airfoil axis to form a cored airfoil.

20. The method as recited in claim 18, further comprising:
locating an innermost CMC ply directly adjacent a central airfoil axis to form a solid airfoil.

* * * * *